United States Patent [19]

Williams

[11] Patent Number: 4,995,324

[45] Date of Patent: Feb. 26, 1991

[54] METHOD OF DISPOSING OF WASTE MATERIAL

[76] Inventor: Robert M. Williams, 16 La Hacienda, Ladue, Mo. 63124

[21] Appl. No.: 552,922

[22] Filed: Jul. 16, 1990

[51] Int. Cl.$^5$ .............................................. F23B 7/00
[52] U.S. Cl. .................................... 110/234; 110/186; 110/196; 110/222; 110/232; 110/346
[58] Field of Search ............... 110/232, 222, 196, 234, 110/255, 257, 185, 186, 346; 122/2

[56] References Cited

U.S. PATENT DOCUMENTS

| | | | |
|---|---|---|---|
| 4,637,327 | 1/1987 | Jorgensen | 110/196 X |
| 4,732,090 | 3/1988 | Bollmann, Sr. et al. | 110/196 |
| 4,750,437 | 6/1988 | Rouse | 110/346 |
| 4,796,544 | 1/1989 | Overgaard | 110/196 |

FOREIGN PATENT DOCUMENTS 3002962  7/1981  Fed. Rep. of Germany ...... 110/232

Primary Examiner—Edward G. Favors
Attorney, Agent, or Firm—Gravely, Lieder & Woodruff

[57] ABSTRACT

A system for recovery of the heat value of waste material, that heretofore has been wasted through landfill disposal, but in which the collected bales of waste material are passed through a bale breaker to release the waste material into a free condition so it can moved in a free flowing stream into a conveyor-type storage unit for movement to a grinder which reduces the mix of waste material to a substantially uniform particle size prior to being air moved into a boiler for recovery of the heat value which on burning produces steam to drive a generator to produce electrical power for energizing the power consumers in the system, with any excess being fed to an external power grid.

12 Claims, 1 Drawing Sheet

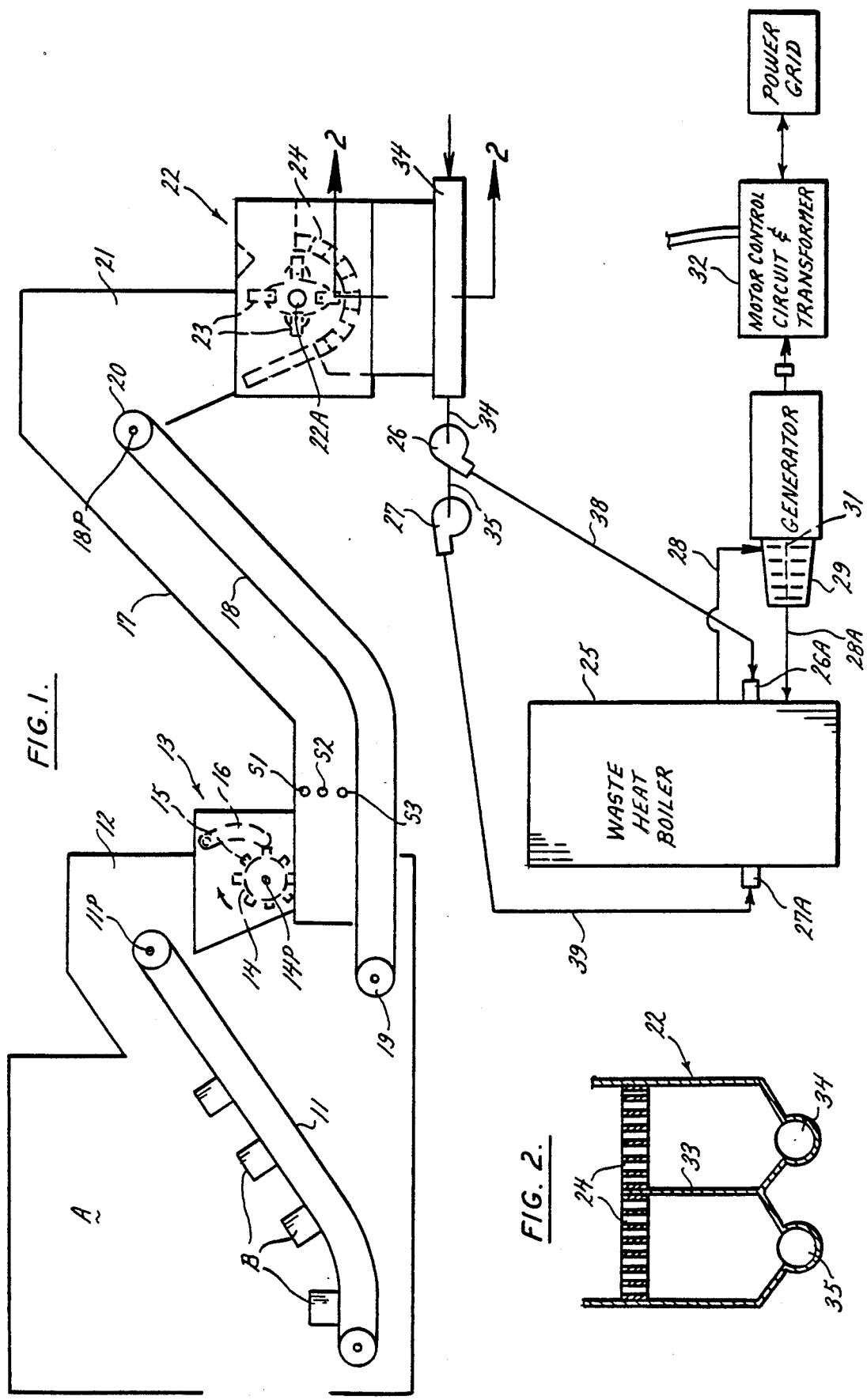

1

METHOD OF DISPOSING OF WASTE MATERIAL

BACKGROUND OF THE INVENTION

1. Field of the Invention

This invention is related to direct firing of a boiler with waste material such as a wide variety of paper, cardboard fabrics, and paper-like goods that is presently baled up and hauled off for disposal in land fills, and to apparatus for utilizing such paper goods as a source of fuel for producing electrical energy in sufficient quantity first to power the apparatus and supply the power demand of the system with any excess power being released back to the source of start-up electrical energy.

2. Description of the Prior Art

The usual practice in producing paper goods, cardboard and similar material is to use recycled material at least twice and sometimes three times before it is considered of such poor quality as to be unacceptable in the commercial world. Such poor quality material is generally disposed of in a landfill operation where decay can finish the process of disposal.

The current disposal habit is to compact the poor quality material into bales that weigh about fifty to sixty pounds per cubic foot per bale in a good many instances when properly compacted. Those bales contain cloth, pieces of metal and other miscellaneous objects which normally are disposable in landfills. The older concept of disposal by burning is no longer permitted so the fuel value is no longer available but is lost to landfill procedures.

A BRIEF DESCRIPTION OF THE INVENTION

The object of the present invention is to recover the fuel value of the paper material in the bales and at the same time dispose of the material by utilizing it as a fuel for direct firing of a boiler to produce steam which can drive an electric generator, thereby producing electric power while leaving a minimum ash residue in a sanitized condition.

Another object is to process bales of paper material in a system that conserves space by avoiding breaking up the bales until it is fed into apparatus capable of handling the bales in a system able to break up the bales and feed the released paper material into a grinder which reduces the material into a continuous stream of fines which can be blown into a boiler much like a fluid fuel for direct firing of a steam generating boiler.

Still another object is to bring together apparatus that is able to effectively break up the bales of paper and other material and feed it into a live bottom conveyor mechanism that moves it into a grinding mill for reduction to a state of fineness that permits it to be air moved for direct firing of a boiler resulting in final reduction to a santized ash residue while producing steam for driving means to recover the energy through an electric generator to power the entire system, with excess capacity being directed back to an electrical grid system.

Other objects will be set forth in the following description of a preferred method employing apparatus which performs the steps of the method in an efficient manner.

BRIEF DESCRIPTION OF THE DRAWINGS EMBODIMENT FOR THIS INVENTION

The practice of the present invention is carried out in the operation of items of apparatus organized as follows:

FIG. 1 is a diagrammatic arrangement of apparatus for moving bales of paper and other material into a bale breaker and to direct the material when released from the bales into a live bottom covered conveyor path for transport to a grinding stage in advance of moving the ground output into a boiler for direct firing of the boiler; and FIG. 2 is a fragmentary sectional detail of the grinding means which splits the material during grinding to produce at least two discharges of the ground material into individual air streams for direct delivery to a boiler at different inlets.

DETAILED DESCRIPTION OF THE APPARATUS AND THE METHOD OF OPERATION THEREOF

The apparatus for performing the method hereof comprises a collection structure in which prebaled paper, cardboard and similar fiberous material may be initially gathered in readiness for being subjected to the preparation of breaking up the bales of such material so that it becomes loose. If that were the only preparation step, the loose mass would increase its volume very quickly to substantially fill the collection structure. However, at this initial stage the bales are not broken but are deposited directly or otherwise moved into a bale breaker. For example, the bales B are deposited by any suitable loader (not shown) onto a conveyor belt 11 which carries the stream of bales B to a sufficient elevated position where they can topple into the housing 12 of a bale breaker 13. The rotor 14 in the breaker is equipped with suitable hammers 15 which cooperate with a breaker plate 16 so that the bales are broken open and paper and/or fiberous material is set free for ease of further handling. The conveyor 11 is operated by a variable speed motor connected to the pulling lip.

The contents of each bale can consist of paper made from a mix of rags, metallic objects, straw, wood particles or other fibrous material generally known as papyrus or paper. In some instances a soft pulp cohering mass composed of linen, wood and similar material is present in the paper making process. This can be included in the make up of the fibrous material which falls into the foregoing mix of paper, cardboard, and the like is included in that term "fibrous material" or "waste material."

As the subject material is broken up, it is passed into an elongated tunnel-like enclosure 17 having a live bottom belt conveyor 18 which is suitably tracked over an idler pulley 19 and a driver pully 20 where the loose mass falls into an enclosure 21 over a shredder 22 which reduces the loose particles by the grinding effect of the hammers 23 into a predetermined particle size of the order of one to two inch pieces that are able to pass through the openings in the grate 24.

The enclosure 17 which retains a supply of the material on the conveyor 18 is sized such that the belt can support and temporarily store and accommodate a mass of material which weighs an average of about 10 pounds per cubic foot. That is a considerable volume increase from the baled condition which averages on the order of fifty to sixty pounds per cubic foot. As the material issues from the bale breakers 13, it reaches a depth on the live bottom storage conveyor belt 18 of about three feet, and there the volume can increase because the enclosure 17 allows an increase in depth of up to about five feet as it moves up the incline before the material falls into the enclosure 21.

The spacing between the bale breaker 13 and the grinder 22 is calculated to provide a space to hold a supply of material that can equal about thirty minutes of a supply to feed the grinder 22 in the event the feed from the breaker 13 is interrupted. The feature of the live bottom conveying assembly of the enclosure 17 and conveyor 18 is that the drive pulley 20 is operated by a variable speed motor (not shown) which is intended to be responsive to the boiler demand for varying the feed of material to the secondary grinder 22 at the rate to maintain direct flow of ground output between the grinder 22 and the boiler 25. In order to accomplish this feed rate, and also provide for possible interruption from time to time at the breaker 13, the distance between the breaker 13 and the grinder 22 can be adjusted from about twenty feet to forty feet. The transfer of ground material from the grinding mill 22 is by blowers 26 and 27 which blow the ground particulate to the boiler 25 at substantially 5000 feet per minute.

The boiler and associated equipment is shown diagrammatically in FIG. 1. The assembly includes the boiler 25 having two feed inlets 26A and 27A. There is an outlet 28 arranged to emit steam. The outlet 28 directs the steam into turbine 29 which is connected by a suitable shaft 30 to an electric generator 31. The current output from generator 31 is suitably supplied to a control circuit operatively contained in the console 32 for controlling each of the motors (not shown but well understood in the art) driving the conveyor power pulley 11P, the drive for the power shaft 14P of rotor 14, the conveyor power pulley 18A, the shaft 22A for the grinder 22, and each of the shafts for the blowers 26 and 27.

FIG. 2 shows the arrangement in the outlet for the shredder 22 of at least one splitter baffle 33 which automatically divides the outlet flow of material through the grate 24 into side-by-side outlet conduits 34 and 35 which lead into the suction inlets of the respective blowers 26 and 27. The blower outlets 36 and 37 are respectively connected by conduits 38 and 39 to the respective boiler fuel inlets 26A and 27A. Should there be more than a short term or momentary interruption in the fuel supply to the boiler 25 from the grinder 22, an external source of fuel (not shown) can be relied upon to maintain steam production for turbine 29, thereby generating power to operate the several motors which drive the operating components in the system.

A feature of the system diagrammatically shown in FIG. 1 is that the operation of either blower 26 or 27, or operations of both, will be sufficient to withdraw dust and fines that are released by the breaker 13 into the confines of the closed system and finally enter into the boiler. This feature eliminates most, if not all, of the pollutants in and around the operation of the system.

Heretofore, the bales of fibrous material brought to the place of disposal have been broken open to release a high volume of material before it can be fed to the grinder. That problem is overcome, along with the pollution caused by premature release of the baled material, by feeding the unbroken bales into a bale breaker 13 which is placed under a vacuum by the operation of one or more blowers 26 and 27 located at the outlet end of the path of travel of the material after it is broken open from its baled condition and shredded.

The control provisions for operating the several drive motors is set up to feed the fibrous material into the boiler 25 only as fast as the boiler needs the fuel. Thus, the worker placing bales into the breaker 13 can be kept informed of the rate of feed of bales by the arrangement of sensors S-1, S-2 and S-3 at or near the inlet to the housing 17. For example, the sensor S-1, which can be a sounder or a light, will indicate that the housing 17 is full and the accumulation of material in housing 17 is up to its desired maximum. Further bales do not therefore have to be fed into the breaker until the sensor S-2 indicates an average loading in the housing 17. Thus, the worker can strive to keep the sensor S-2 operative for efficient use of the apparatus. A shortage of bales in the reception area under the covered area A may result in the actuation of the sensor S-3 which indicates that the mass of material in the housing 17 is the only quantity of material being moved into the grinder enclosure 21. If the conveyor housing 17 cannot be refilled so the sensor S-2 is energized, that will call for the actuation of the means to supply auxiliary fuel to the boiler.

The foregoing specification has set forth a preferred method and apparatus for the practice of that method whereby waste material of a fiberous or paperlike substance, normally prepared for disposal in baled form, is fed into a system which required that the bales of waste material should be broken apart so the loose particles can be conveyed to a shredder for reduction to a predetermined particle size. The system then delivers the grinder output by blower action to a boiler where the heat value is recovered and converted to electric power, while sanitized ash remains.

What is claimed is:

1. A method of disposing of baled waste material as a fuel in a system of direct firing a boiler having a variable demand for fuel and recovering the heat value thereof as a source of power, the method comprising:
    (a.) subjecting stored bales of waste material to a step of breaking up the bales to free the waste material as needed;
    (b.) feeding the freed waste material into a live bottom storage unit;
    (c.) conveying the freed waste material out of the storage unit at a rate determined by the boiler demand and reducing the waste material to a predetermined particle size;
    (d.) direct firing the particles of the waste material in a boiler for reduction to an ash condition while producing steam and;
    (e.) utilizing the steam to generate electrical power.

2. The method set forth in claim 1 wherein the reduction of the waste material is split into at least two paths leading to the boiler.

3. The method set forth in claim 1 wherein the breaking up of the bales proceeds in accordance with the sensed fuel demand of the boiler.

4. The method set forth in claim 1 wherein the feeding of the freed waste material into a live bottom storage unit is responsive to a predetermined accumulation of the freed waste material in the live bottom storage unit.

5. The method set forth in claim 1 wherein the accumulation of the freed waste material is sufficient to continue direct firing of the boiler upon a temporary lack of stored bales.

6. The method set forth in claim 1 wherein direct firing the particles of the waste material substantially eliminates the release of pollutants outside the system of direct firing a boiler.

7. A system for recovery of the heat value of baled waste material that is collected and supplied to a boiler to produce heat energy, the system comprising the steps of:
   (a.) passing collected bales of waste material through a bale breaker to release the waste material into a free condition;
   (b.) directing the thus freed waste material into a live bottom storage unit for movement to a place of release;
   (c.) receiving the released waste material from the live bottom storage unit and subjecting the waste material to a grinding step for converting the waste material to a body of substantially uniform particle size;
   (d.) delivering the substantially uniform particle size waste material to a step of combustion for recovery of the heat value; and
   (e.) converting the heat value into the generation of electrical power.

8. The system of claim 7 wherein the delivering of the substantially uniform particle size to a combustion step simultaneously effects the collection of dust in the system.

9. The system of claim 7 wherein the steps of passing the collected bales through a breaker, the directing of the freed waste material, the grinding step, and the delivery to a combustion step are each effected by the utilizing of electrical power; and making use of the generated electrical power to supply the electrical power utilized in the system.

10. Apparatus for disposing of waste material collected in baled form comprising:
    (a.) bale breaking means to free up the waste material from its baled form;
    (b.) conveyor means to collect the freed up waste material and move it along a path to a discharge end;
    (c.) means collecting the discharged waste material in a closed space;
    (d.) grinding means adjacent said closed collecting space for reducing the waste material to a predetermined particle size; and
    (e.) blower means to collect the ground waste material from said grinder and remove it from said grinder.

11. The apparatus set forth in claim 10, and including a boiler connected to said blower means to receive the ground particles and convert the combustion of the waste particles to ash and steam; and operatively connect an electrical generator to said boiler to utilize the steam to produce electric power.

12. The apparatus set forth in claim 10 wherein each of said bale breaking means, said conveyor means, and shredding means is operated by electric motor means, and circuit means connects each electric motor means with said electric power from said generator.

* * * * *